United States Patent [19]
Haedt

[11] Patent Number: 5,275,216
[45] Date of Patent: Jan. 4, 1994

[54] LIQUID OVERFLOW SHUT-OFF VALVE

[76] Inventor: Christopher R. Haedt, P.O. Box 806, Grand Blanc, Mich. 48439

[21] Appl. No.: 925,825

[22] Filed: Aug. 7, 1992

[51] Int. Cl.⁵ .............................................. F16K 21/20
[52] U.S. Cl. ........................................ 141/95; 141/198; 137/393; 137/558; 116/109; 116/227; 116/283; 73/290 R
[58] Field of Search ................... 141/18, 21, 39, 40, 141/46, 94, 95, 192, 198, 206; 417/38; 137/213, 214, 393, 558; 116/109, 227, 281, 283; 73/290

[56] References Cited

U.S. PATENT DOCUMENTS

| | | | |
|---|---|---|---|
| 2,853,041 | 9/1958 | Oakes | 116/109 |
| 2,888,171 | 5/1959 | Turner | 141/192 X |
| 4,191,208 | 3/1980 | Mylander | 137/393 |
| 4,292,996 | 10/1981 | Pataki et al. | 137/393 |
| 4,445,456 | 5/1984 | Nelson | 116/283 X |
| 4,454,760 | 6/1984 | Carlisle | 73/299 X |
| 4,654,643 | 3/1987 | Meisenheimer, Jr. | 116/281 X |
| 5,007,450 | 4/1991 | Babb et al. | 137/315 |
| 5,069,243 | 12/1991 | Foreman | 141/198 X |

*Primary Examiner*—J. Casimer Jacyna
*Attorney, Agent, or Firm*—Donald C. Bolger

[57] ABSTRACT

An add-on liquid overflow shut-off valve for a tank. The device is used to ensure that a holding tank is not overfilled and provides a fail safe way to prevent spillage when pumping into a holding tank. The device provides a warning indicator when the holding tank is near full. The device also has a fail safe switch which will turn off air to a pump when the holding tank is full and also blow a whistle to indicate the tank is full. The device uses a diaphragm which operates on a pressure differential. When the pressure is increase past a spring set point, the diaphragm raises a plate that activates a switching valve which shuts off air supply to an air pump and blows a whistle.

6 Claims, 2 Drawing Sheets

LIQUID OVERFLOW SHUT-OFF VALVE

BACKGROUND OF THE INVENTION

The field of the invention is generally that of devices for the storage of liquids, and more specifically, to an improved shut-off valve for use in pumping liquid into a storage vessel that shuts off the delivery pump when the tank becomes full.

Proper storage and handling of waste liquids, especially toxic liquids, has become very important because of the discovery that so many of them have been found to cause cancer and other serious diseases. Liquids that previously were treated as mere waste are now known to be highly dangerous to humans, as well as to the environment, and require careful and safe storage until they can be rendered harmless by further processing or become benign by passage of time.

The need to store these materials in leak-proof containers is now required by such government agencies as OSHA (Occupational Health and Safety Agency), the National Health Institute and Others. A wide array of storage containers may be used, from small 1 and 2 gallon cans to large tanks, both underground and transportable. A container widely used in this situation is a drum or holding tank; drums are quite plentiful and its thick metal walls will safely store most materials.

These tanks, along with other such containers, contain a standard, 2 inch diameter threaded aperture in the lid known as a "bung hole" that can be used for pouring or pumping liquid into the drum as well as to have test probes inserted thereinto for the purpose of determining various attributes of the stored liquid. This same bunghole type opening is also found in virtually all storage tanks from the very small to the extremely large. The rim of the bung hole usually contains a series of threads to accept a threaded plug known as a "bung".

One disadvantage in the use of storage tanks and drums, is that they are so well sealed no light can penetrate the interior. In many cases no incandescent lamp can be safely used to aid one looking inside because the stored contents are either poisonous or highly combustible. Often the drum is pumped completely full of liquid and the pump is not shut down soon enough with the result that liquid spills out of the lid openings over the sides and onto the ground or other supporting surface to cause the toxic condition to become a problem all over again. Positioning a person to continually observe the level of fullness in the tanks raises labor costs and places him or her in a dangerous position near the toxic material.

Many of these valves are used in the automotive quick oil change service stations. Here, oil is removed from a vehicle and stored in a pit tank. Then oil is pumped from the pit tank to a large holding tank on the ground floor. The holding tank has a shut off valve when it is near full and shuts off the pump in the pit area. A disposal company is called and a truck is sent to remove the oil from the holding tank. If or when the valve on the holding tank sticks or fails, an oil spill is inevitable.

The prior art has tried to deal with the problem of shutting off the flow of liquid into a tank, when the level reaches the uppermost safe point, but such attempts have not met with success.

U.S. Pat. No. 5,007,450 (Add-on Liquid Overflow Shut-Off Valve for Tank) describes a portable device for stopping delivery to a tank when the liquid reaches a preset level. This patented valve is complex, costly, is inefficient due to air leakage, can stick, wear, and cannot easily be checked to see if it is working properly.

The present invention solves these problems by providing a pressure valve with a similar function, however, containing no floats that stick, has no moving parts in the liquid, no air leakage, and provides an easy way to check the valve to ensure that it is operating properly.

SUMMARY OF THE INVENTION

Generally speaking, the present invention comprises a novel add-on liquid overflow shut-off valve for a tank. The valve contains a diaphragm that works on the pressure differential. A tube is placed into the tank and as the liquid level rises, pressure increases on the lower side of a diaphragm until the force on a spring is overcome and the shut-off valve is actuated.

One of the many uses is in the automotive oil change quick service industry. Oil is drained from vehicles into small tank in a pit. An air pump is used to pump the oil from the small tank into a larger holding tank. This unit is mounted in the large holding tank and has a visual indicator that the tank is about twelve inches from being full and a waste hauler should be called. However, if employees fails to check the indicator the unit ensures that no spillage occurs out of the large holding tank as the unit will shut off air supply to the air pump and blow a whistle.

It is an object of the present invention to provide a novel shut-off valve that has no moving parts in the liquid that is being stored.

It is a further object of the invention to provide a novel shut-off valve that is not prone to wear or sticking.

It is another object of the invention to provide a novel shut-off valve which has an indicator which can be used to make a diagnostic check to ensure the unit is working properly.

It is a further object of the invention to provide a novel shut-off valve that shuts off air to an air driven feed pump and sounds a whistle at the same time.

It is another object of the invention to provide a novel shutoff valve which provides a visual indicator before the unit shuts off so that a tank can be emptied before a whistle sounds.

It is a further object of the invention to provide a novel shut-off valve which eliminates float sticking problems.

It is another object of the invention to provide a low cost design that is reliable.

It is a further object of the invention to provide an energy efficient design that avoids compressed air leakage.

Further objects are implicit in the detailed description which follows hereinafter (which is to be considered as exemplary of, but not specifically limiting, the present invention) and said objects will be apparent to persons skilled in the art after a careful study of the detailed description which follows.

For the purpose of clarifying the nature of the present invention, one exemplary embodiment of the invention is illustrated in the hereinbelow-described figures of the accompanying drawings and is described in detail hereinafter. It is to be taken as representative of the multiple embodiments of the invention which lie within the scope of the invention.

DESCRIPTION OF THE PREFERRED EMBODIMENTS

One of the many uses of this shut-off device is to shut-off an air pump that is used to pump waste oil into a storage tank. The device provides an indicator when the oil in the tank reaches twelve inches before the unit shuts off.

Figure 1:
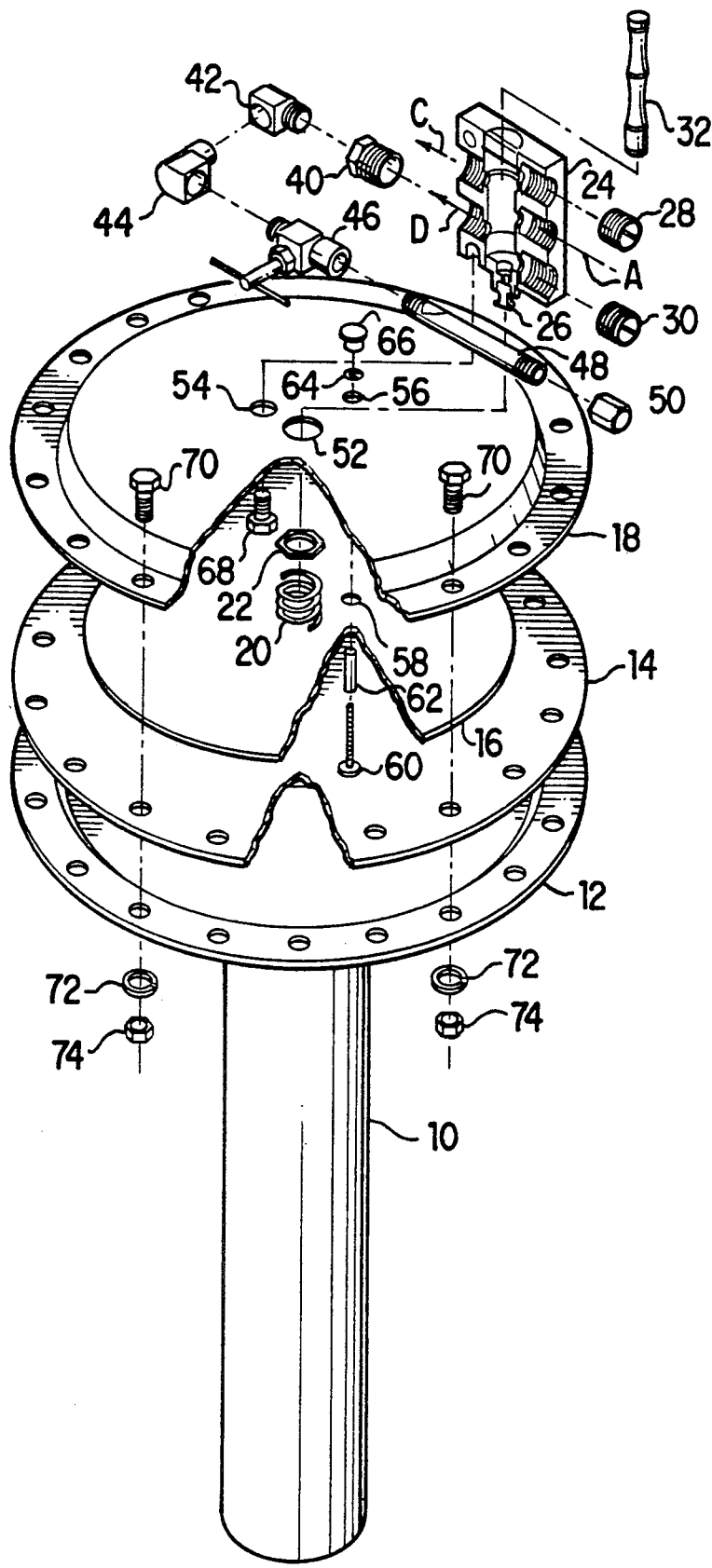
FIG. 1 is a perspective view showing one exemplary embodiment of one representative form of the shut-off valve.

Referring to FIG. 1, lower flange member 12 has equally spaced holes around the outer portion and also has a hole in the center equal in diameter to tube 10. Tube 10 can be a rigid or a flexible tube which is welded to the center of lower flange member 12. Diaphragm 14 likewise has equally spaced holes around the outer portion that correspond to the holes in lower flanged member 12. Plate 16 is a metal plate that is smaller than diaphragm 14 so that the plate 16 moves upward when diaphragm 14 is stretched. Plate 16 has hole 58 near the center. Upper flanged member 18, likewise, has equally spaced holes around the outer portion and hole 52, hole 54, and hole 56 near the center.

A gasket sealer may be used between upper flange member 18 and lower flange member 12 to secure the diaphragm between the flanges.

Plug 28 and plug 30 are installed in switching valve 24. Nipple 40 is installed into port D of switching valve 24. Elbow 42 is installed into nipple 40. Elbow 44 is installed into elbow 42. Pitch adjustment valve 46 is installed into elbow 44. Whistle pipe 48 is installed into pitch adjustment valve 46. Plug 50 is installed onto whistle pipe 48.

Switching valve 24 is mounted on upper flange member 18 and secured by bolt 68. Bolt 68 is bored through the center which vents the top side of diaphragm 14 to atmosphere. Actuator 26 is inserted through hole 52 and secured by nut 22. Bolt 68 is then inserted through hole 54 and into the base of switching valve 24 to secure switching valve 24 in place.

Screw 60 passes through oversized hole 58 and spacer 62 is installed. Then screw 60 is inserted through hole 56 and O-ring 64 and nut 66 is installed with thread locking compound.

The outer holes of diaphragm 14 are aligned with the holes in lower flanged member 12. Plate 16 is centered and glued to diaphragm 14. Spring 20 is installed over actuator 26. Spring 20 returns diaphragm 14 fully when no liquid level is present. The outer holes of upper flanged member 18 are aligned with the outer holes of lower flanged member 12. Threaded fasteners 70 are inserted through the outer holes and lock washers 72 and nuts 74 are secured.

In normal operation, air is supplied to port A of switching valve 24 and spool 32 directs the air to port C which activates an air driven pump. When a differential pressure moves diaphragm 14 upward, plate 16 overcomes the combined tension in spring 20 and actuator 26 which opens actuator 26. When actuator 26 is moved upward, spool 32 moves upward and shuts off air to port C and redirects the air to port D. When air to port C is shut off, the air pump connected to port C is shut off. When air is redirected to port D, the whistle blows. Pitch adjustment valve 46 is used to adjust he pitch of the whistle for various air pressures.

The unit is installed in a two inch "bung" with the bottom of tube 10 about 16 inches below the desired shut-off point. The actual shut-off point of the unit may vary a few inches due to changes in air pressure and pump discharge head.

Figure 2:
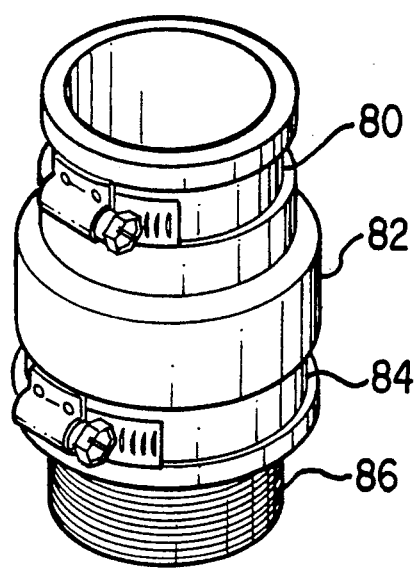
FIG. 2 is a perspective view showing one exemplary embodiment of one representative form of the shut-off valve connector.

FIG. 2 shows nipple 86 that is threaded for a two inch "bung". Flexible connector 82 is connected to nipple 86 by worm clamp 84. Tube 10 is inserted through connector 82 and secured by worm clamp 80. Tube 10 can be made shorter or longer to adjusted the set point of the shut-off of switching valve 24.

To check the unit for proper operation, nut 66 can be pulled upward. This will stop the air pump and blow the whistle. If nut 66 is held down, switching valve 24 will continue to operate, because hole 58 is larger than spacer 62.

As a tank fills up with fluid and reaches about three to four inches up tube 10, nut 66 will begin to rise showing indicator spacer 62 which is red. As indicator spacer 62 is exposed, the customer should call to have the tank emptied because only another six to twelve inches remain in the tank capacity. When tank capacity is reached the unit will shut-off the air pump and blow the whistle.

What is claimed is:

1. An add-on liquid overflow shut-off valve to prevent fluid flow into a tank comprising:
   a tube;
   a lower flanges member having an opening;
   means for connecting said tube to said lower flanged member wherein air may ingress and egress through said tube and through said opening of lower flanged member;
   a diaphragm;
   a plate;
   an upper flanged member having a first opening and a second opening;
   means for connecting said plate between said upper flanged member and said diaphragm;
   means for connecting said diaphragm between said upper flanged member and said lower flanged member;
   a switching valve;
   means for mounting said switching valve to said upper flanged member whereby said switching valve is activated to prevent fluid flow when said plate moves towards said first opening in said upper flanged member and said switching valve is de-activated when said plate moves away from said first opening in said upper flanged member;
   an indicator member;
   means for connecting said indicator member to said plate whereby said indicator member will protrude through said second opening in upper flanged member as said plate moves toward said upper flanged member.

2. The device as recited in claim 1, further including a spring between said plate and said upper flanged member.

3. The device as recited in claim 1, wherein said tube is a flexible tube used as a remote sensing tube.

4. The device as recited in claim 1, wherein the means for connecting said diaphragm between said upper flanged member and said lower flanged member is threaded fasteners.

5. The device as recited in claim 1, further including an adhesive to connect said diaphragm to said plate.

6. The device as recited in claim 1, further including a gasket sealer applied in areas where the diaphragm is secured by said upper flanged member and said lower flanged member.

* * * * *